US010631220B1

(12) United States Patent
Mansour et al.

(10) Patent No.: US 10,631,220 B1
(45) Date of Patent: Apr. 21, 2020

(54) SYSTEMS, METHODS, AND DEVICES FOR COMMUNICATING WITH A WIRELESS NETWORK USING MULTIPLE TRANSCEIVERS

(71) Applicant: Sprint Spectrum LP, Overland Park, KS (US)

(72) Inventors: Nagi A Mansour, Arlington, VA (US); Noman Alam, Chantilly, VA (US); Kevin A. Hart, Oakton, VA (US); Akin Ozozlu, McLean, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 31 days.

(21) Appl. No.: 16/043,464

(22) Filed: Jul. 24, 2018

(51) Int. Cl.
*H04W 36/18* (2009.01)
*H04W 36/08* (2009.01)
*H04W 36/00* (2009.01)

(52) U.S. Cl.
CPC ....... *H04W 36/18* (2013.01); *H04W 36/0016* (2013.01); *H04W 36/08* (2013.01)

(58) Field of Classification Search
CPC . H04W 36/18; H04W 36/0016; H04W 36/08; H04W 36/00; H04W 36/0005; H04W 36/0007; H04W 36/0009; H04W 36/03; H04B 7/18541; H04L 47/767
See application file for complete search history.

(56) References Cited

U.S. PATENT DOCUMENTS

| | | | | |
|---|---|---|---|---|
| 6,230,013 | B1* | 5/2001 | Wallentin | H04W 36/12 455/436 |
| 6,999,434 | B1* | 2/2006 | Agrawal | H04W 36/18 370/331 |
| 8,228,861 | B1* | 7/2012 | Nix | H04W 36/00 370/329 |
| 2009/0232089 | A1* | 9/2009 | Lott | H04W 36/0055 370/331 |
| 2011/0110334 | A1* | 5/2011 | Hirano | H04W 12/06 370/331 |
| 2019/0116536 | A1* | 4/2019 | Xu | H04W 52/0206 |

\* cited by examiner

*Primary Examiner* — Sharad Rampuria

(57) ABSTRACT

Systems, methods, and processing nodes for communicating with a wireless network using multiple transceivers by instructing a serving access node to initiate a handover of a wireless device to a target access node, wherein the wireless device is simultaneously communicatively coupled to each of the serving access node and the target access node, and wherein the wireless device is engaged in a first communication session with the serving access node, instructing the serving access node to transmit data associated with the first communication session to the target access node, and instructing the wireless device to establish a second communication session with the target access node, wherein the second communication session is established seamlessly at the wireless device.

17 Claims, 7 Drawing Sheets

SYSTEMS, METHODS, AND DEVICES FOR COMMUNICATING WITH A WIRELESS NETWORK USING MULTIPLE TRANSCEIVERS

TECHNICAL BACKGROUND

Wireless networks incorporating various different types of access nodes (including relay access nodes and other small-cell access nodes) are becoming increasingly common. As a consequence, a wireless device attached to an access node may frequently switch to communicating with a different access node, depending on a location, transmit/receive signal strength, or resource requirement of the wireless device. Such switching between access nodes may be referred to as a "handover" to those having ordinary skill in the art. However, although handovers are well known in the art, the current state of the art suffers from limitations in the ability of a wireless device or wireless network to efficiently perform handovers. For example, wireless devices must disconnect from a first (i.e. serving) access node and attach to a second (i.e. target) access node, and the serving and target node must exchange a large volume of data (including with other network elements) to successfully perform a handover. Thus, there is a need in the art for more efficient handovers.

OVERVIEW

Exemplary embodiments described herein include systems, methods, and wireless devices for communicating with a wireless network using multiple transceivers. An exemplary system described herein for communicating with a wireless network using multiple transceivers includes a first access node wirelessly coupled to a first transceiver of a wireless device, a second access node wirelessly coupled to a second transceiver of the wireless device, wherein the second access node is further communicably coupled to the first access node, and a processor communicably coupled to at least one of the first and second access nodes. The processor is configured to perform operations comprising instructing the first access node to transmit session information to the second access node, wherein the session information is associated with a first session between the first access node and the wireless device, instructing the first access node to synchronize, with the second access node, transmission of a downlink data stream to the wireless device, and instructing the wireless device to synchronize, with the first and second access nodes, transmission of an uplink data stream to the second access node, and instructing the second access node to create a second session between the second access node and the wireless device, wherein the second session seamlessly combines one or both of the downlink data stream and the uplink data stream with the first session.

An exemplary method described herein for communicating with a wireless network using multiple transceivers includes instructing a serving access node to initiate a handover of a wireless device to a target access node, wherein the wireless device is simultaneously communicatively coupled to each of the serving access node and the target access node, and wherein the wireless device is engaged in a first communication session with the serving access node, instructing the serving access node to transmit data associated with the first communication session to the target access node, and instructing the wireless device to establish a second communication session with the target access node. The second communication session is established seamlessly at the wireless device.

An exemplary processing node described herein for communicating with a wireless network using multiple transceivers is configured to perform operations comprising instructing a serving access node to initiate a handover of a wireless device to a target access node, wherein the wireless device is simultaneously communicatively coupled to each of the serving access node and the target access node, and wherein the wireless device is engaged in a first communication session with the serving access node, instructing the serving access node to transmit data associated with the first communication session to the target access node, and instructing the wireless device to establish a second communication session with the target access node, wherein the second communication session is established seamlessly at the wireless device.

DETAILED DESCRIPTION

Figure 1:
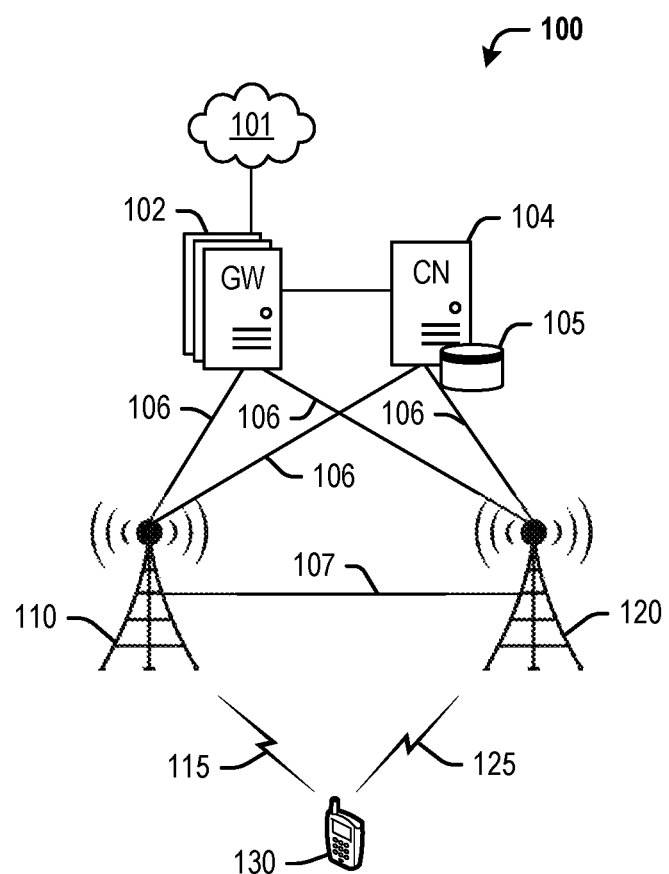
FIG. 1 depicts an exemplary system for communicating with a wireless network using a plurality of transceivers.

Exemplary embodiments described herein include systems, methods, and wireless devices configured for communicating with a wireless network using multiple transceivers. Exemplary wireless devices described herein are configured with at least two transceivers. Each transceiver may be configured to communicate with a different access node. For example, each transceiver may be configured to attach to a wireless air interface deployed by a corresponding access node. Exemplary wireless devices described herein may be located within a radio range of said at least two access nodes, enabling the transceivers of the wireless devices to attach to the at least two access nodes. In an exemplary embodiment, the wireless device comprises at least two transmitter modules and at least four receiver modules. In another exemplary embodiment, the first transceiver comprises at least one first transmitter module and at least two first receiver modules, and the second transceiver comprises at least one second transmitter module and at least two second receiver modules.

Further, the exemplary systems described herein are configured to perform a handover of a wireless device from a first access node to a neighboring access node. The handover may be initiated by, for example, an access node, while maintaining a connection of each transceiver of the wireless device with the corresponding access node. For example, a wireless device may be attached to a first access node with a first transceiver, and may initiate a handover to a nearby or neighboring access node. The exemplary systems described herein are configured to perform operations including initiating a connection between the second transceiver of the wireless device and the neighboring access node, instructing the first (i.e. serving) access node to transmit data to the neighboring access node, and breaking the connection between the first transceiver and the serving access node. By instructing the first and second access nodes and the wireless device to synchronize uplink and/or downlink data streams prior to ending the first session (with the serving access node) and beginning the second session (with the target access node), a seamless handover may be performed without interrupting a user experience of the wireless device, or a connection of the wireless device with the wireless network. The serving access node is further communicably coupled to the target access node via, for instance, an X2 connection that enables transfer of session and other information. Further, exemplary methods described herein include operations that involve handovers performed during an active uplink session as well as handovers performed during active downlink sessions. Thus, in exemplary embodiments described herein, the serving access node is instructed to transmit data associated with the uplink and/or downlink session to the target access node.

In an exemplary embodiment, for downlink sessions, the serving access node may be instructed to transmit a first portion of downlink data to the first transceiver of the wireless device, and the target access node may be instructed to transmit a second portion of downlink data to the second transceiver of the wireless device. In other words, the serving and target access nodes are instructed to synchronize transmission of a downlink data stream to the wireless device. The first and second portions of downlink data may be part of the downlink stream or session that comprises, for example, a plurality of downlink data packets originating from a network node outside the core network and addressed to the wireless device. Thus, the wireless device is configured to assemble and/or combine the first and second downlink portions received respectively at its first and second transceivers. Further, upon combining or synchronizing the downlink portions, the wireless device is configured to establish a second communication session with the target access node to seamlessly continue the downlink session and/or any other sessions.

In another exemplary embodiment, for uplink sessions, in which the wireless device is engaged in an active uplink session with the serving access node, the wireless device is instructed to begin transmitting a first portion of uplink data to the target access node using the first transceiver, and to transmit a second portion of uplink data to the target access node using the second transceiver. In other words, the wireless device and serving and target access nodes are instructed to synchronize transmission of an uplink data stream to the target access node. For example, the uplink data stream may comprise uplink data packets addressed to a destination node outside the core network. Thus, the target access node is instructed to combine the first and second portions of uplink data prior to establishing the second communication with the wireless device, and forward the uplink data packets to the destination node via gateways, etc. Subsequently, a second session is created between the target access node and the wireless device to seamlessly continue the uplink session and/or any additional sessions in which the wireless device was engaged prior to the handover.

Further, in addition to the systems and methods described herein, these operations may be implemented as computer-readable instructions or methods, and processing nodes on the network for executing the instructions or methods. For example, a processing node coupled to one or both of the serving and target access nodes or another network node may be configured to perform the operations described herein. These and other embodiments are further described with reference to FIGS. 1-7 below.

FIG. 1 depicts an exemplary system for communicating with a wireless network using multiple transceivers. System 100 comprises a communication network 101, gateway node(s) 102, controller node 104, access nodes 110 and 120, and wireless device 130. In this exemplary embodiment, access nodes 110, 120 may be macrocell access nodes, such as next generation or gigabit NodeBs (gNBs) in 5G networks, or enhanced eNodeBs (eNBs) in 4G/LTE networks. Access nodes 110, 120 may communicate with each other through a direct connection 107 that comprises, for example, an X2 connection. Access nodes 110, 120 may further communicate with gateway node(s) 102 and controller node 104 via connections 106.

Further, as described herein, wireless device 130 is capable of simultaneously maintaining a wireless connection with each of the at least two access nodes 110, 120. For example, wireless device 130 comprises at least two transceivers, wherein a first transceiver of the wireless device 130 is configured to attach to a first radio air interface deployed by a first access node 110 (via, for example, wireless connection 115), and a second transceiver of the wireless device 130 is configured to attach to a second radio air interface deployed by the second access node 120 (via, for example, wireless connection 125). In an exemplary embodiment, the wireless device 130 comprises at least two transmitter modules and at least four receiver modules. In another exemplary embodiment, the first transceiver comprises at least one first transmitter module and at least two first receiver modules, and the second transceiver comprises at least one second transmitter module and at least two second receiver modules. Further, in other embodiments, any other combination of access nodes, relay access nodes, and wireless devices may be evident to those having ordinary skill in the art in light of this disclosure.

In this exemplary embodiment, system 100 is further configured to perform a handover of wireless device 130 from the first access node 110 to neighboring access node 120. The handover may be initiated by, for example, a serving access node 110, while maintaining a connection of each transceiver of the wireless device 130 with the corresponding access nodes 110, 120. For example, wireless device 130 may be attached to serving access node 110 with a first transceiver, engaged in a communication session (such as, for example, a downlink session or an uplink session), and may initiate a handover to nearby or neighboring access node 120. To achieve this, operations are performed that include instructing access nodes 110, 120 to initiate a handover including transmitting session information via connection 107 and downlink and/or uplink data via connections 115, 125, such that the handover is performed seamlessly and without interrupting a connection of the wireless device 130 with the wireless network 101 and/or network nodes accessible via network 101. In other words, instructing the first and second access nodes 110, 120 and the wireless device 130 to synchronize uplink and/or downlink data streams prior to ending the first session (with the serving access node 110) and beginning the second session (with the target access node 120) enables a seamless handover, wherein any interruptions are avoided in uplink/downlink sessions.

For example, for downlink sessions using wireless connection 115, the serving access node 110 may be instructed to transmit a first portion of downlink data to the first transceiver of the wireless device 130, and the target access node 120 may be instructed to transmit a second portion of downlink data to the second transceiver of the wireless device 130. In other words, the serving and target access nodes 110, 120 are instructed to synchronize transmission of a downlink data stream to the wireless device 130. The first and second portions of downlink data may be part of the downlink stream or session that comprises, for example, a plurality of downlink data packets originating from a network node outside the core network (comprising gateway nodes 102, controller node 104, and other network nodes not shown herein), accessible via network 101, and addressed to the wireless device 130. Thus, the wireless device 130 is configured to assemble and/or combine the first and second downlink portions received at its first and second transceivers from access nodes 110, 120 respectively. Further, upon combining or synchronizing the downlink portions, the wireless device 130 is configured to establish a second communication session with the target access node 120 (using, for example, wireless connection 125) to seamlessly continue the downlink session and/or any other sessions.

For uplink sessions, in which the wireless device 130 is engaged in an active uplink session with the serving access node 110 (via, for example, wireless connection 115), the wireless device 130 is instructed to begin transmitting a first portion of uplink data to the target access node 120 using the first transceiver, and to transmit a second portion of uplink data to the target access node 120 using the second transceiver. Further, serving access node 110 is instructed to transmit session information related to the uplink session to target access node 120 via, for example, direct connection 107. In other words, the wireless device 130 and serving and target access nodes 110, 120 are instructed to synchronize transmission of an uplink data stream to the target access node 120. For example, the uplink data stream may comprise uplink data packets addressed to a destination node accessible via network 101. Thus, the target access node 120 is instructed to combine the first and second portions of uplink data prior to establishing the second communication with the wireless device 130, and forward the uplink data packets to the destination node. Subsequently, a second session is created between the target access node 120 and the wireless device 130 to seamlessly continue the uplink session and/or any additional sessions in which the wireless device 130 was engaged prior to the handover.

Access nodes 110, 120 can be any network node configured to provide communication between wireless device 130 and communication network 101, including standard access nodes such as a macro-cell access node, base transceiver station, a radio base station, an eNodeB device, an enhanced eNodeB device, a gigabit NodeB (or gNodeB) in 5G New Radio ("5G NR"), or the like. For example, access nodes 110, 120 may implement 5G NR technologies to deploy a wireless radio air interface that supports frequency bands ranging from, e.g., 600 MHz to 100 GHz. In some embodiments, access nodes 110, 120 may deploy a radio air interface that supports frequency bands ranging from 2 GHz to 100 GHz. In some embodiments, access nodes 110, 120 may deploy a radio air interface that supports multiple frequency bands selected from 2 GHz to 100 GHz. In an exemplary embodiment, access nodes 110, 120 can have a coverage area in the range of approximately five kilometers to thirty-five kilometers and an output power in the tens of watts. Further, access nodes 110, 120 may comprise any short range, low power, small-cell access nodes such as a microcell access node, a picocell access node, a femtocell access node, or a home eNodeB device.

Access nodes 110 and 120 can each comprise a processor and associated circuitry to execute or direct the execution of computer-readable instructions to perform operations such as those further described herein. Briefly, access nodes 110 and 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110 and 120 can receive instructions and other input at a user interface. Access nodes 110, 120 communicate with gateway node(s) 102 and controller node 104 via communication links 106. Access nodes 110, 120 may communicate with each other, and other access nodes (not shown), using a direct communication link 107, such as an X2 link. Components of exemplary access nodes 110, 120 are further described with reference to FIG. 3.

Wireless device 130 may be any device, system, combination of devices, or other such communication platform capable of communicating wirelessly with access nodes 110, 120 using one or more frequency bands deployed therefrom. Wireless device 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible. Wireless device 130 (and other exemplary wireless devices described herein) may be configured with at least two transceivers. Each transceiver may be configured to communicate with a different access node. For example, each transceiver may be configured to attach to a wireless air interface deployed by a corresponding access node. Exemplary wireless devices described herein may be located within a radio range of said at least two access nodes, enabling the transceivers of the wireless devices to attach to the at least two access nodes. In an exemplary embodiment, the wireless device 130 comprises at least two transmitter modules and at least four receiver modules. In another exemplary embodiment, the first transceiver comprises at least one first transmitter module and at least two first receiver modules, and the second transceiver comprises at least one second transmitter module and at least two second receiver modules.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless device 130. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrie Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, Ti, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include Si communication links, X2 communications links, etc. Other wireless protocols can also be used. Communication links 106, 107 can be a direct link or might include various equipment, intermediate components, systems, and networks. Communication links 106, 107 may comprise many different signals sharing the same link.

Gateway node(s) 102 can be any network node configured to interface with other network nodes using various protocols. Gateway node(s) 102 can communicate user data over system 100. Gateway node(s) 102 can be standalone computing devices, computing systems, or network components, and can be accessible, for example, by a wired or wireless connection, or through an indirect connection such as through a computer network or communication network. For example, gateway node(s) 102 can include a serving gateway (S-GW) and/or a public data network gateway (P-GW), etc. One of ordinary skill in the art would recognize that gateway node(s) 102 are not limited to any specific technology architecture, such as Long Term Evolution (LTE) or 5G NR, and can be used with any network architecture and/or protocol.

Each of gateway node(s) 102 can comprise a processor and associated circuitry to execute or direct the execution of computer-readable instructions to obtain information. Gateway node(s) 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node(s) 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as configurations and capabilities of access nodes 110, 120, wireless device 130, session information associated with wireless connections 115, 125, and any other information that enables controller node 104 to perform handovers and other operations described herein. This information may be requested by or shared with gateway node(s) 102 and/or access nodes 110, 120 via communication links 106, 107, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101.

Further, the methods, systems, devices, networks, access nodes, and equipment described herein may be implemented with, contain, or be executed by one or more computer systems and/or processing nodes. The methods described herein may also be stored on a non-transitory computer readable medium. Many of the elements of system 100 may be, comprise, or include computers systems and/or processing nodes. This includes, but is not limited to: gateway node(s) 102, controller node 104, access nodes 110, 120, wireless device 130, and/or network 101.

Figure 2:
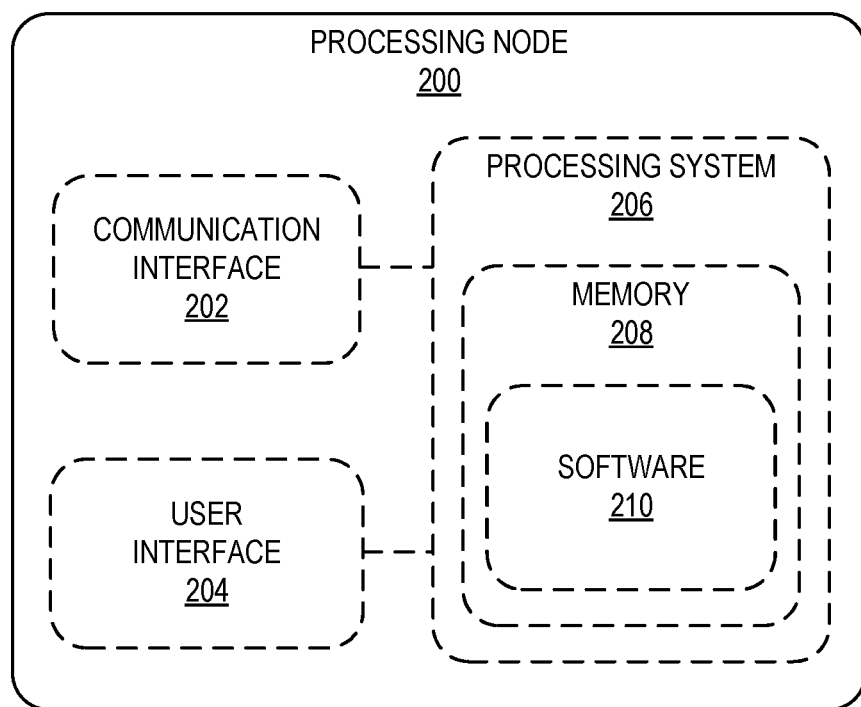
FIG. 2 depicts an exemplary processing node for communicating with a wireless network using a plurality of transceivers.

FIG. 2 depicts an exemplary processing node for communicating with a wireless network using multiple transceivers. Processing node 200 comprises a communication interface 202, user interface 204, and processing system 206 in communication with communication interface 202 and user interface 204. Processing system 206 includes storage 208, which can comprise a disk drive, flash drive, memory circuitry, or other memory device. Storage 208 can store software 210 which is used in the operation of the processing node 200. Storage 208 may include a disk drive, flash drive, data storage circuitry, or some other memory apparatus. For example, storage 208 may include a buffer. Software 210 may include computer programs, firmware, or some other form of machine-readable instructions, including an operating system, utilities, drivers, network interfaces, applications, or some other type of software. For example, software 210 may include a module for performing handovers and associated operations described herein. Processing system 206 may include a microprocessor and other circuitry to retrieve and execute software 210 from storage 208. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Figure 3:
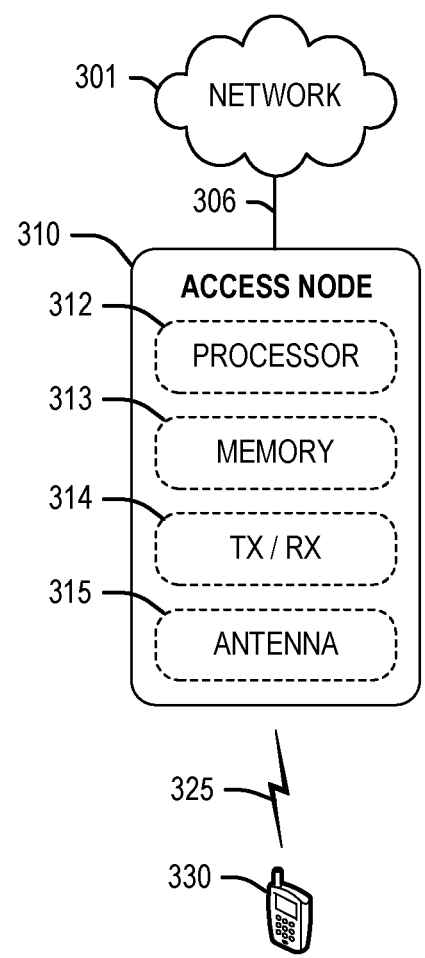
FIG. 3 depicts an exemplary access node.

FIG. 3 depicts an exemplary access node 310. Access node 310 may comprise, for example, a macro-cell access node, such as access node 110 described with reference to FIG. 1. Access node 310 is illustrated as comprising a processor 312, memory 313, transceiver 314, and antenna 315. Processor 312 executes instructions stored on memory 313, while transceiver 314 and antenna 315 enable wireless communication with wireless device 330. Instructions stored on memory 313 can include deploying an air-interface carrier to which wireless device 330 can attach to access network services directly. Thus, access node 310 may be referred to as a serving access node. Access node 310 may further be configured to perform a handover of wireless device 330 to a neighboring access node (not shown herein). The handover may be initiated by access node 310 while maintaining a connection of each transceiver of the wireless device 330, such that wireless device 330 initiates a connection between its second transceiver and the neighboring access node, and access node 310 transmits data to the neighboring access node, and breaks the session with the first transceiver of the wireless device 330. The handovers may be performed during an active uplink session as well as during active downlink sessions. For downlink sessions, the serving access node 310 transmits a first portion of downlink data to the first transceiver of the wireless device 330, and the target access node transmits a second portion of downlink data to the second transceiver of the wireless device 330, such that the serving and target access nodes synchronize transmission of a downlink data stream to the wireless device 330. The first and second portions of downlink data may be part of the downlink stream or session that comprises, for example, a plurality of downlink data packets originating from a network node outside the core network 301 and addressed to the wireless device 330. Thus, the wireless device 330 is configured to assemble and/or combine the first and second downlink portions received respectively at its first and second transceivers. Further, upon combining or synchronizing the downlink portions, the wireless device 330 is configured to establish a second communication session with the target access node to seamlessly continue the downlink session and/or any other sessions.

For uplink sessions, in which the wireless device 330 is engaged in an active uplink session with the serving access node 310, the wireless device 330 is instructed to begin transmitting a first portion of uplink data to the target access node using the first transceiver, and to transmit a second portion of uplink data to the target access node using the second transceiver. Further, the serving access node 310 is instructed to transmit session information related to the uplink session to the target access node via, for example, an X2 or other direct connection. In other words, the wireless device 330 and serving and target access nodes are instructed to synchronize transmission of an uplink data stream to the target access node. For example, the uplink data stream may comprise uplink data packets originating at wireless device 330 and addressed to a destination node accessible via network 301. Thus, the target access node is instructed to combine the first and second portions of uplink data prior to establishing the second communication with the wireless device 330, and forward the uplink data packets to the destination node via gateways, etc. Subsequently, a second session is created between the target access node and the wireless device 330 to seamlessly continue the uplink session and/or any additional sessions in which the wireless device 330 was engaged prior to the handover.

Figure 4:
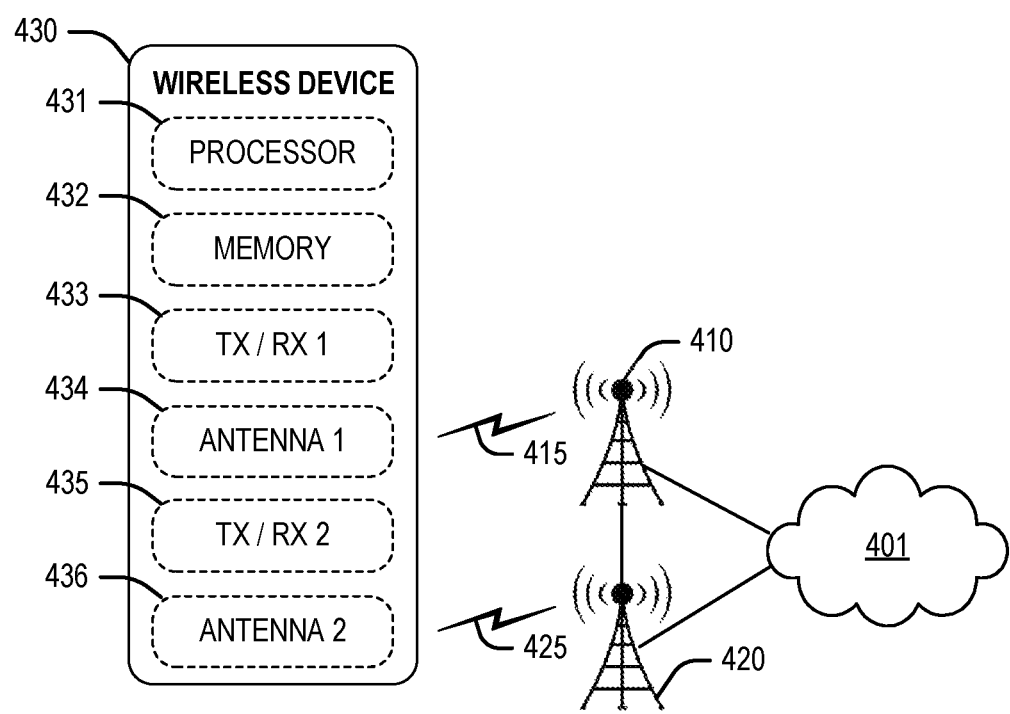
FIG. 4 depicts an exemplary wireless device for communicating with a wireless network using a plurality of transceivers.

FIG. 4 depicts an exemplary wireless device 430. Wireless device 430 may be any device, system, combination of devices, or other such communication platform capable of communicating wirelessly with access nodes 410, 420 using one or more frequency bands deployed therefrom. Wireless device 430 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible. Wireless device 430 is illustrated as comprising a processor 431, memory 432, first transceiver 433, first antenna 434, second transceiver 435, and second antenna 436. Processor 431 executes instructions stored on memory 432, while transceivers 433, 435 and antennae 434, 436 enable wireless communication with access nodes 410, 420. Each of transceivers 433, 435 may be configured to communicate with a different access node. For example, transceiver 433 and antenna 434 may be configured to attach to a wireless air interface deployed by access node 410 (using, for example, wireless connection 415), and transceiver 435 and antenna 436 may be configured to attach to a wireless air interface deployed by access node 420 (using, for example, wireless connection 425). In an exemplary embodiment, the wireless device 430 comprises at least two transmitter modules and at least four receiver modules. For example, the first transceiver 433 comprises at least one first transmitter module and at least two first receiver modules, and the second transceiver 435 comprises at least one second transmitter module and at least two second receiver modules. Further, although not illustrated herein, antennae 434, 436 may comprise any number of antennae, and may be physically arranged within a casing of wireless device 430 so as to enable communicating simultaneously using different frequencies and to avoid interference.

Further, instructions stored on memory 432 can include maintaining and initiating wireless connections 415, 425 and uplink and/or downlink sessions thereon. Further, instructions stored on memory 432 include combining or synchronizing first and second portions of downlink data streams received respectively at transceivers 433, 435 from access nodes 410, 420. Further, upon combining or synchronizing the downlink portions, the wireless device 430 is configured to establish a second communication session with the target access node 420 to seamlessly continue the downlink session and/or any other sessions. For uplink sessions, in which the wireless device 430 is engaged in an active uplink session with the serving access node 410, the wireless device 430 is instructed to begin transmitting a first portion of uplink data to the target access node 420 using the first transceiver 433, and to transmit a second portion of uplink data to the target access node 420 using the second transceiver 435. Further, the serving access node 410 is instructed to transmit session information related to the uplink session to the target access node 420 via, for example, an X2 or other direct connection. In other words, the wireless device 430 and serving and target access nodes 410, 420 are instructed to synchronize transmission of an uplink data stream to the target access node 420. The target access node 420 is instructed to combine the first and second portions of uplink data prior to establishing the second communication with the wireless device 430. Subsequently, a second session is created between the target access node 420 and the wireless device 430 to seamlessly continue the uplink session and/or any additional sessions in which the wireless device 430 was engaged prior to the handover.

Figure 5:
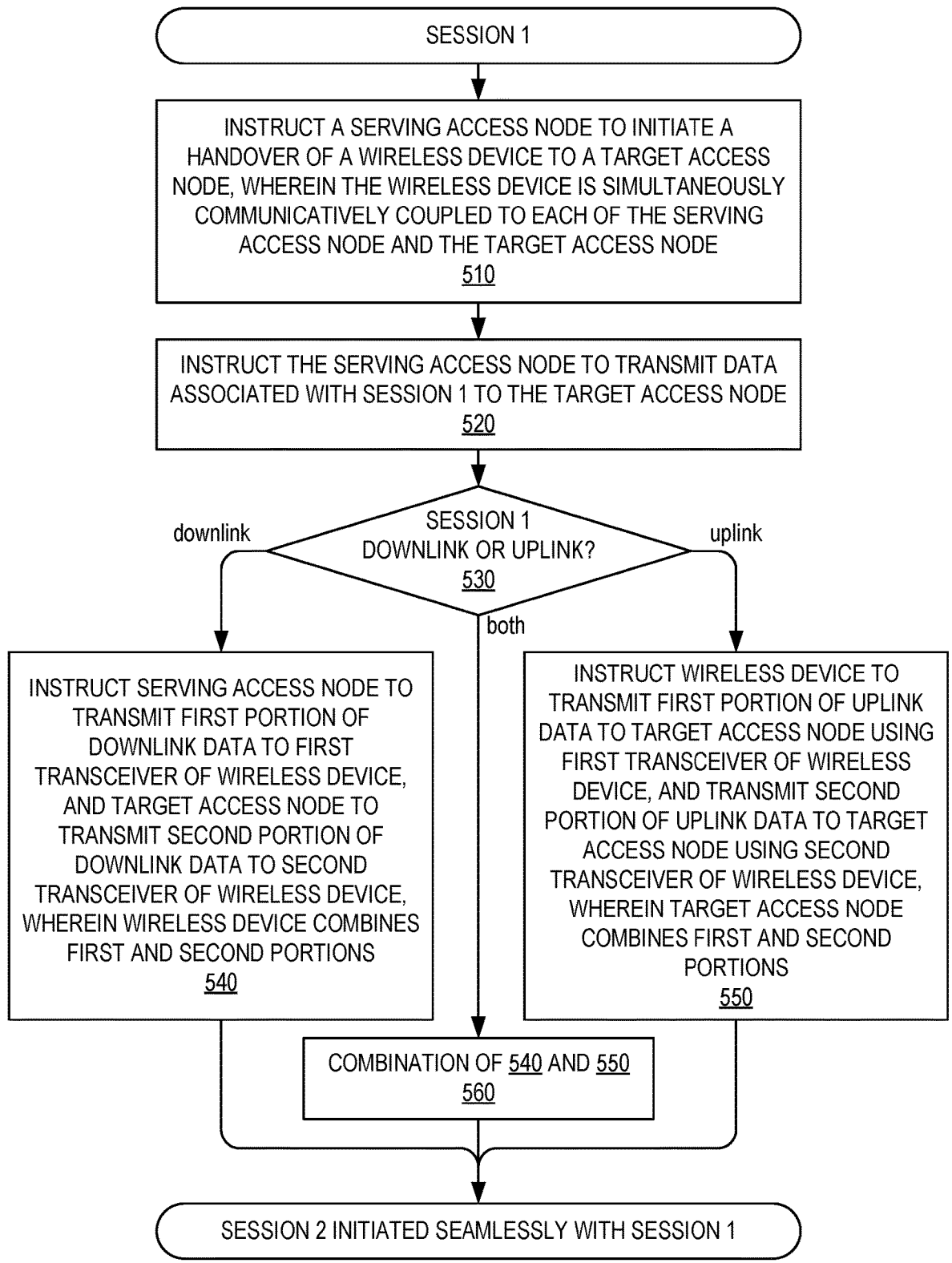
FIG. 5 depicts an exemplary method for communicating with a wireless network using a plurality of transceivers.

FIG. 5 depicts an exemplary method for communicating with a wireless network using multiple transceivers. The exemplary method of FIG. 5 may be implemented using components similar to those depicted in system 100, such as access nodes 110, 120, or wireless device 130. Although FIG. 5 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

The method begins with a first communication session (i.e. session 1) between a wireless device and an access node. For example, the wireless device and access node may be part of a system, with access nodes comprising macrocell access nodes, such as next generation or gigabit NodeBs (gNBs) in 5G networks, or enhanced eNodeBs (eNBs) in 4G/LTE networks. The wireless device is configured with at least two transceivers. Each transceiver may be configured to communicate with a different access node. For example, each transceiver may be configured to attach to a wireless air interface deployed by a corresponding access node. Exemplary wireless devices described herein may be located within a radio range of said at least two access nodes, enabling the transceivers of the wireless devices to attach to the at least two access nodes. In an exemplary embodiment, the wireless device comprises at least two transmitter modules and at least four receiver modules. In another exemplary embodiment, the first transceiver comprises at least one first transmitter module and at least two first receiver modules, and the second transceiver comprises at least one second transmitter module and at least two second receiver modules.

At 510, a handover is initiated of the wireless device from the first (i.e. serving) access node to a neighboring (i.e. target) access node. The handover may be initiated by, for example, instructing the serving access node to hand over the wireless device to the target access node, while maintaining a connection of each transceiver of the wireless device with the corresponding access node. At 520, the serving access node is instructed to transmit data to the neighboring access node. The data may be related to session 1, and includes session information, quality of service, modulation and coding information, source and destination addresses, etc. At 530, it is determined whether session 1 is an active uplink session or an active downlink session, or a combination. At 540, for downlink sessions, the serving access node may be instructed to transmit a first portion of downlink data to the first transceiver of the wireless device, and the target access node may be instructed to transmit a second portion of downlink data to the second transceiver of the wireless device. In other words, the serving and target access nodes are instructed to synchronize transmission of a downlink data stream to the wireless device. The first and second portions of downlink data may be part of the downlink stream or session that comprises, for example, a plurality of downlink data packets originating from a network node outside the core network and addressed to the wireless device. Thus, the wireless device is configured to assemble and/or combine the first and second downlink portions received respectively at its first and second transceivers. Further, upon combining or synchronizing the downlink portions, the wireless device is configured to establish a second communication session (i.e. session 2) with the target access node to seamlessly continue the session 1 and/or any other sessions. In other words, instructing the serving and target access nodes and the wireless device to synchronize uplink and/or downlink data streams prior to ending the first session (with the serving access node) and beginning the second session (with the target access node) enables a seamless handover, wherein any interruptions are avoided in uplink/downlink sessions.

If, at 530, it is determined that session 1 is an active uplink session, then the wireless device is instructed to begin transmitting a first portion of uplink data to the target access node using the first transceiver, and to transmit a second portion of uplink data to the target access node using the second transceiver. In other words, the wireless device and serving and target access nodes are instructed to synchronize transmission of an uplink data stream to the target access node. For example, the uplink data stream may comprise uplink data packets addressed to a destination node outside the core network. Thus, the target access node is instructed to combine the first and second portions of uplink data prior to establishing the second communication with the wireless device, and forward the uplink data packets to the destination node via gateways, etc. Subsequently, a second session (i.e. session 2) is created between the target access node and the wireless device to seamlessly continue the session 1 and/or any additional sessions in which the wireless device was engaged prior to the handover.

Further, at 560 it is determined that session 1 comprises a combination of uplink and downlink sessions, and operations 540 and 550 are both performed. In other words, the serving and target access nodes are instructed to synchronize transmission of a downlink data stream to the first and second transceivers of the wireless device, and the wireless device and serving and target access nodes are instructed to synchronize transmission of an uplink data stream to the target access node. This combination of seamlessly combining uplink and downlink sessions is enabled by wireless devices comprising a plurality of transceivers, including at least two transmitters and four receivers, according to an exemplary embodiment.

Figure 6:
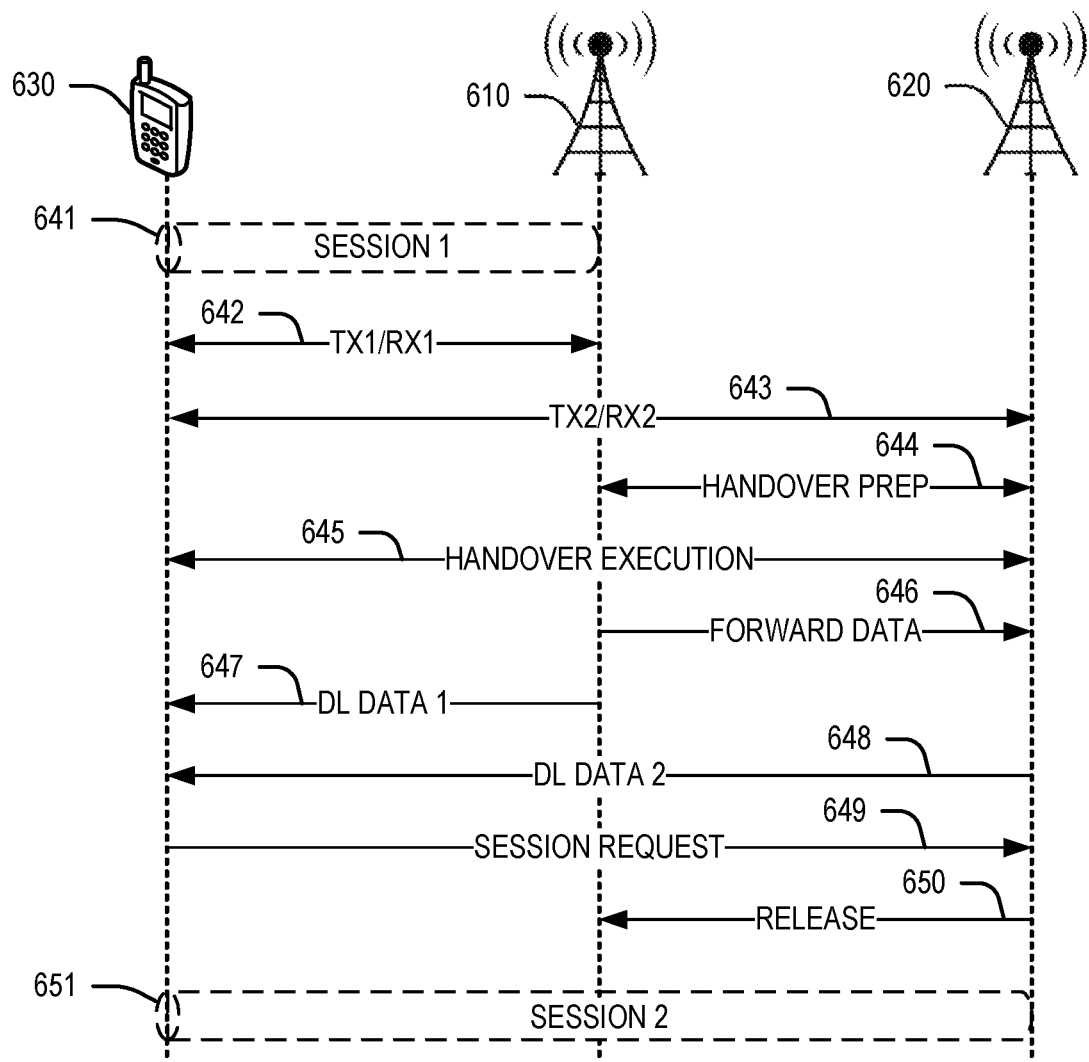
FIG. 6 depicts an exemplary network flow for communicating with a wireless network using a plurality of transceivers.

FIG. 6 depicts an exemplary network flow for communicating with a wireless network using at least two transceivers. The exemplary network flow of FIG. 6 may be implemented using components similar to those depicted in system 100, such as access nodes 610 and 620, and wireless device 630. Although FIG. 6 depicts components arranged (and steps performed) in a particular order for purposes of illustration and discussion, the components and operations discussed herein are not limited to any particular order or arrangement. One skilled in the art, using the disclosures provided herein, will appreciate that various features described herein can be omitted, rearranged, combined, and/or adapted in various ways.

The method begins with a first communication session 641 between wireless device 630 and access node 610 (i.e. serving access node). In this embodiment, session 1 may be a downlink session. For example, the wireless device 630 and access node 610 may be part of a system, with access nodes 610, 620 comprising macrocell access nodes, such as next generation or gigabit NodeBs (gNBs) in 5G networks, or enhanced eNodeBs (eNBs) in 4G/LTE networks. The wireless device 630 is configured with at least two transceivers. Each transceiver may be configured to communicate with a different access node. For example, at 642, a first transceiver (i.e. TX/RX1) of wireless device 630 may be configured to attach to a wireless air interface deployed by access node 610, and at 643, a second transceiver (i.e. TX/RX2) of wireless device 630 may be configured to attach to a wireless air interface deployed by access node 620. At 644, a handover is initiated of the wireless device 630 from the serving access node 610 to target access node 620. The handover may be initiated by, for example, instructing the serving access node to hand over the wireless device to the target access node, while maintaining a connection of each transceiver of the wireless device with the corresponding access node. Consequently, at 645, target access node 620 and wireless device 630 begin a handover execution using, for example, the second transceiver, which enables a seamless handover.

Meanwhile, at 646, the serving access node 610 is instructed to transmit data to the target access node 620. The data may be related to session 1, and includes session information, quality of service, modulation and coding information, source and destination addresses, etc. In this embodiment, session 1 is an active downlink session. Thus, at 647, the serving access node 610 is instructed to transmit a first portion of downlink data to the first transceiver of the wireless device 630 and, at 648, the target access node is instructed to transmit a second portion of downlink data to the second transceiver of the wireless device 630. In other words, the serving and target access nodes 610, 620 are instructed to synchronize transmission of a downlink data stream to the wireless device 630. The first and second portions of downlink data may be part of the downlink stream or session that comprises, for example, a plurality of downlink data packets originating from a network node outside the core network and addressed to the wireless device 630. Thus, the wireless device 630 is configured to assemble and/or combine the first and second downlink portions received respectively at its first and second transceivers.

Further, upon combining or synchronizing the downlink portions, the wireless device is configured to establish a second communication session by transmitting a session request 649 to the target access node 620, so as to seamlessly continue the session 1 and/or any other sessions. At 650, the target access node 620 releases the connection with the source access node 610, and creates the second session 651 with the wireless device 630.

Figure 7:
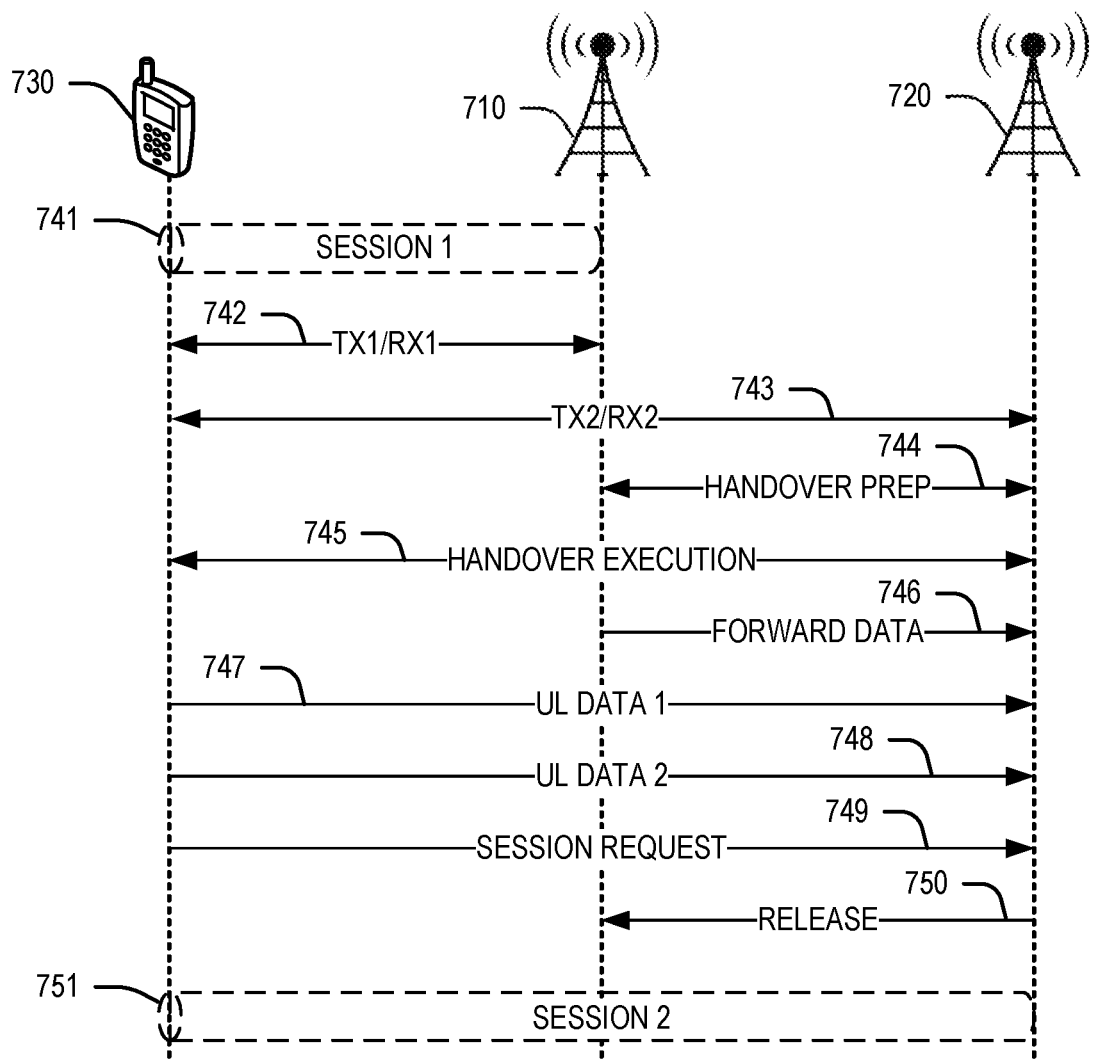
FIG. 7 depicts another exemplary network flow for communicating with a wireless network using a plurality of transceivers.

FIG. 7 depicts an exemplary network flow for communicating with a wireless network using at least two transceivers. The exemplary network flow of FIG. 7 may be implemented using components similar to those depicted in system 100, such as access nodes 710 and 720, and wireless device 730. Although FIG. 7 depicts components arranged (and steps performed) in a particular order for purposes of illustration and discussion, the components and operations discussed herein are not limited to any particular order or arrangement. One skilled in the art, using the disclosures provided herein, will appreciate that various features described herein can be omitted, rearranged, combined, and/or adapted in various ways.

The method begins with a first communication session 741 between wireless device 730 and access node 710 (i.e. serving access node). In this embodiment, session 1 may be a downlink session. For example, the wireless device 730 and access node 710 may be part of a system, with access nodes 710, 720 comprising macrocell access nodes, such as next generation or gigabit NodeBs (gNBs) in 5G networks, or enhanced eNodeBs (eNBs) in 4G/LTE networks. The wireless device 730 is configured with at least two transceivers. Each transceiver may be configured to communicate with a different access node. For example, at 742, a first transceiver (i.e. TX/RX1) of wireless device 730 may be configured to attach to a wireless air interface deployed by access node 710, and at 743, a second transceiver (i.e. TX/RX2) of wireless device 730 may be configured to attach to a wireless air interface deployed by access node 720. At 744, a handover is initiated of the wireless device 730 from the serving access node 710 to target access node 720. The handover may be initiated by, for example, instructing the serving access node to hand over the wireless device to the target access node, while maintaining a connection of each transceiver of the wireless device with the corresponding access node. Consequently, at 745, target access node 720 and wireless device 730 begin a handover execution using, for example, the second transceiver, which enables a seamless handover.

Meanwhile, at 746, the serving access node 710 is instructed to transmit data to the target access node 720. The data may be related to session 1, and includes session information, quality of service, modulation and coding information, source and destination addresses, etc. In this embodiment, session 1 is an active uplink session. Thus, at 747, the wireless device 730 is instructed to begin transmitting a first portion of uplink data to the target access node using the first transceiver and, at 748, to transmit a second portion of uplink data to the target access node using the second transceiver. In other words, the wireless device 730 and serving and target access nodes 710, 720 are instructed to synchronize transmission of an uplink data stream to the target access node 720. For example, the uplink data stream may comprise uplink data packets addressed to a destination node outside the core network. Thus, the target access node 720 is instructed to combine the first and second portions of the uplink data prior to establishing the second communication with the wireless device 730.

Further, the wireless device is configured to transmit a session request 749 to the target access node 720, so as to seamlessly continue the session 1 and/or any other sessions. At 750, the target access node 720 releases the connection with the source access node 710, and creates the second session 751 with the wireless device 730.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for communicating with a wireless network using multiple transceivers, the method comprising:
    instructing a serving access node to initiate a handover of a wireless device to a target access node, wherein the wireless device is simultaneously communicatively coupled to the serving access node via a first transceiver of the wireless device and to the target access node via a second transceiver of the wireless device, and wherein the wireless device is engaged in a first communication session with the serving access node;
    instructing the serving access node to transmit data associated with the first communication session to the target access node;
    when the first communication session is a downlink session, instructing the serving access node to transmit a first portion of downlink data to the first transceiver of the wireless device and instructing the target access node to transmit a second portion of downlink data to the second transceiver of the wireless device; and
    instructing the wireless device to establish a second communication session with the target access node, wherein the second communication session is established seamlessly at the wireless device.

2. The method of claim 1, wherein:
    the second communication session seamlessly continues the downlink session from the target access node.

3. The method of claim 2, further comprising instructing the serving access node to transmit the first portion of downlink data to the first transceiver of the wireless device prior to the wireless device establishing the second communication session with the target access node.

4. The method of claim 1, further comprising instructing the wireless device to synchronize the first and second portions of downlink data prior to establishing the second communication with the target access node.

5. The method of claim 1, wherein:
    the first communication session comprises an uplink session, and
    the second communication session seamlessly continues the uplink session from the wireless device.

6. The method of claim 5, further comprising instructing the wireless device to begin transmitting a first portion of uplink data to the target access node, wherein the first portion is scheduled to be transmitted using the first transceiver.

7. The method of claim 6, further comprising instructing the wireless device to transmit a second portion of uplink data to the target access node using the second transceiver.

8. The method of claim 7, further comprising instructing the target access node to synchronize the first and second portions of uplink data prior to establishing the second communication with the target access node.

9. A system for communicating with a wireless network using at least two transceivers, the system comprising:
    a first access node wirelessly coupled to a first transceiver of a wireless device;
    a second access node wirelessly coupled to a second transceiver of the wireless device, wherein the second access node is further communicably coupled to the first access node; and
    a processor communicably coupled to at least one of the first and second access nodes, the processor being configured to perform operations comprising:
        instructing the first access node to transmit session information to the second access node, wherein the session information is associated with a first session between the first access node and the wireless device;
        instructing the first access node to synchronize, with the second access node, transmission of a downlink data stream to the wireless device; and
        instructing the wireless device to synchronize, with the first and second access nodes, transmission of an uplink data stream to the second access node, wherein instructing the wireless device to synchronize the transmission of the uplink data stream further comprises instructing the wireless device to transmit a first portion of uplink data to the second access node using the first transceiver to transmit a second portion of uplink data to the second access node using the second transceiver; and
        instructing the second access node to create a second session between the second access node and the wireless device,
    wherein the second session seamlessly combines one or both of the downlink data stream and the uplink data stream with the first session.

10. The system of claim 9, wherein instructing the first access node to synchronize the transmission of the downlink data stream with the second access node further comprises:
    instructing the first access node to transmit a first portion of downlink data to the first transceiver of the wireless device; and
    instructing the second access node to transmit a second portion of downlink data to the second transceiver of the wireless device.

11. The system of claim 10, wherein the wireless device is configured to combine the first and second portions of downlink data.

12. The system of claim 9 wherein the operations further comprise instructing the second access node to combine the first and second portions of uplink data prior to establishing the second session.

13. The system of claim 9, wherein the wireless device comprises at least two transmitter modules and at least four receiver modules.

14. The system of claim 9, wherein:
    the first transceiver comprises at least one first transmitter module and at least two first receiver modules, and
    the second transceiver comprises at least one second transmitter module and at least two second receiver modules.

15. A processing node for communicating with a wireless network via at least two transceivers, the processing node being configured to perform operations comprising:
- instructing a serving access node to initiate a handover of a wireless device to a target access node, wherein the wireless device is simultaneously communicatively coupled to the serving access node via a first transceiver of the wireless device and to the target access node via a second transceiver of the wireless device, and wherein the wireless device is engaged in a first communication session with the serving access node;
- instructing the serving access node to transmit data associated with the first communication session to the target access node;
- when the first communication session is a downlink session, instructing the serving access node to transmit a first portion of downlink data to the first transceiver of the wireless device and instructing the target access node to transmit a second portion of downlink data to the second transceiver of the wireless device; and
- instructing the wireless device to establish a second communication session with the target access node,
- wherein the second communication session is established seamlessly at the wireless device.

16. The processing node of claim 15, wherein the operations further comprise:
- instructing the serving access node to transmit the first portion of downlink data to the wireless device prior to the wireless device establishing the second communication session with the target access node; and
- instructing the wireless device to synchronize the first and second portions of downlink data prior to establishing the second communication session with the target access node.

17. The processing node of claim 15, wherein the first communication session comprises an uplink session, and the operations further comprise:
- instructing the wireless device to begin transmitting a first portion of uplink data to the target access node;
- instructing the wireless device to transmit a second portion of uplink data to the target access node; and
- instructing the target access node to synchronize the first and second portions of uplink data prior to establishing the second communication session with the target access node.

* * * * *